United States Patent
Seceleanu et al.

(10) Patent No.: US 9,198,061 B2
(45) Date of Patent: Nov. 24, 2015

(54) MEETING A COMMUNICATION RESTRICTION REQUIREMENT IN A PROCESS

(71) Applicant: ABB Research Ltd., Zurich (CH)

(72) Inventors: Tiberiu Seceleanu, Vasteras (SE); Tomas Lennvall, Vasteras (SE)

(73) Assignee: ABB Research Ltd. (CH)

( * ) Notice: Subject to any disclaimer, the term of this patent is extended or adjusted under 35 U.S.C. 154(b) by 146 days.

(21) Appl. No.: 13/870,756

(22) Filed: Apr. 25, 2013

(65) Prior Publication Data
US 2013/0235857 A1 Sep. 12, 2013

Related U.S. Application Data

(63) Continuation of application No. PCT/EP2010/066177, filed on Oct. 26, 2010.

(51) Int. Cl.
*H04W 24/04* (2009.01)
*G05B 19/418* (2006.01)
*H04W 28/08* (2009.01)
*H04W 84/18* (2009.01)

(52) U.S. Cl.
CPC .......... *H04W 24/04* (2013.01); *G05B 19/4185* (2013.01); *H04W 28/08* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 7,486,627 | B2 * | 2/2009 | Zhang et al. | 370/255 |
| 7,839,764 | B2 * | 11/2010 | Jiang et al. | 370/216 |
| 8,665,784 | B2 * | 3/2014 | Kang et al. | 370/328 |
| 8,798,084 | B2 * | 8/2014 | Pratt et al. | 370/406 |
| 2002/0141375 | A1 | 10/2002 | Choi | |
| 2004/0259533 | A1 | 12/2004 | Nixon et al. | |
| 2005/0197680 | A1 | 9/2005 | DelMain et al. | |

(Continued)

FOREIGN PATENT DOCUMENTS

| | | |
|---|---|---|
| EP | 2203010 A1 | 6/2010 |
| WO | 2010018522 A2 | 2/2010 |

OTHER PUBLICATIONS

International Search Report and Written Opinion of the International Searching Authority Application No. PCT/EP2010/066177 Completed: Apr. 2, 2012; Mailing Date: Apr. 11, 2012 10 pages.

(Continued)

*Primary Examiner* — Huy D Vu
*Assistant Examiner* — Hong Shao
(74) *Attorney, Agent, or Firm* — Whitmyer IP Group LLC

(57) ABSTRACT

An industrial process control system including a process control device, a first wireless communication network, a second wireless communication network and a first group of wireless field devices interfacing the industrial process and being associated with the first network. The network supervisor device investigates if the field devices of the first group are able to communicate with the process control device via the first network while meeting a communication restriction requirement, and redirects, in case the requirement is not met, communication between some of the field devices in the first group and the process control device to the second network so that the requirement is met for a first part of the field devices using the first wireless communication network and for a second part of the field devices using the second wireless communication network.

16 Claims, 4 Drawing Sheets

(56) References Cited

U.S. PATENT DOCUMENTS

2007/0129011 A1    6/2007    Lal et al.
2007/0195808 A1*   8/2007    Ehrlich et al. ................ 370/408
2009/0046732 A1    2/2009    Pratt, Jr. et al.
2010/0118837 A1    5/2010    Bracha

OTHER PUBLICATIONS

Saifullah, et al.; "Real-Time Scheduling for WirelessHART Networks", in the Technical Report WUCSE-2010-26 from Washington University in St Louis dated May 14, 2010; 10 pages.

* cited by examiner

MEETING A COMMUNICATION RESTRICTION REQUIREMENT IN A PROCESS

FIELD OF THE INVENTION

The invention generally relates to control of industrial processes. More particularly, the invention relates to a method and computer program product for allowing a group of field devices in a process control system for an industrial process to communicate with a process control device while meeting a communication restriction requirement as well as to a network supervisor device for an industrial process control system.

BACKGROUND OF THE INVENTION

It is becoming more and more common to have wireless communication networks in relation to industrial processes, such as pulp and paper processes, manufacturing processes and oil and gas production processes.

These wireless communication networks are normally wireless sensor networks in that they are used for sensing various properties of the process, such as pressure and temperature and then reporting these wirelessly to monitoring equipment.

One known type of wireless sensor network standard is Wireless Hart.

It is of interest to also use such wireless communication networks for control of the process. This means that properties are sensed and based on the sensed properties a control activity is determined and performed.

This control often has to be performed in real-time, which means that a control activity has to be based on a number of simultaneously sensed properties and often also performed fairly fast after the point in time of the sensing. The control thus imposes restrictions on the wireless communication network, communication restrictions, which may be hard to meet.

This problem is briefly mentioned in "Real-Time Scheduling for WirelessHART Networks", by Abusayeed Saifullah, You Xu, Chenyang Lu, and Yixin Chen in the Technical Report WUCSE-2010-26 from Washington University in St Louis dated May 14, 2010. The document does however not propose any real solution to the problem.

The present invention is directed towards solving the problem of meeting such communication restrictions in wireless communication networks used in a process control system.

SUMMARY OF THE INVENTION

One object of the present invention is therefore to provide a method that allows a group of field devices in a process control system for an industrial process to communicate with a process control device while meeting a communication restriction requirement.

This object is according to a first aspect of the invention achieved by a method of allowing a group of field devices in a process control system for an industrial process to communicate with a process control device while meeting a communication restriction requirement, the method being performed in a network supervisor device of the process control system where the process control system further comprises a first wireless communication network, a second wireless communication network and a first group of wireless field devices interfacing the industrial process and being associated with the first wireless communication network, where the method comprises the steps of:

investigating if the field devices of the first group are able to communicate with the process control device via the first wireless communication network while meeting the communication restriction requirement, and in case the communication restriction requirement is not met, redirecting communication between some of the field devices in the first group and the process control device to the second wireless communication network so that the communication restriction requirement is met for a first part of the field devices in the first group using the first wireless communication network and for a second part of the field devices of the first group using the second wireless communication network.

Another object of the present invention is to provide a network supervisor device that allows a group of field devices in a process control system for an industrial process to communicate with a process control device while meeting a communication restriction requirement.

This object is achieved by a network supervisor device for an industrial process control system, where the industrial process control system comprises at least one process control device, a first wireless communication network, a second wireless communication network and a first group of wireless field devices interfacing the industrial process and being associated with the first wireless communication network, the network supervisor device comprising a communication restriction investigating unit configured to investigate if the field devices of the first group are able to communicate with the process control device via the first wireless communication network while meeting a communication restriction requirement, and a communication relocating unit configured to, in case the communication restriction requirement is not met, redirect communication between some of the field devices in the first group and the process control device to the second wireless communication network so that the communication restriction requirement is fulfilled for a first part of the field devices in the first group using the first wireless communication network and for a second part of the field devices of the first group using the second wireless communication network.

Another object is to provide a computer program product for a computer in a process control system, which allows a group of field devices in a process control system for an industrial process to communicate with a process control device while meeting a communication restriction requirement. The computer can as an example be a controller, a network supervisor device, a network manager or a gateway in the process control system.

This object is achieved by a computer program product for allowing a group of field devices in a process control system for an industrial process to communicate with a process control device while meeting a communication restriction requirement, where the process control system further comprises a first wireless communication network, a second wireless communication network and a first group of wireless field devices interfacing the process and being associated with the first wireless communication network, the computer program product comprising computer program code on a data carrier, which when run on a computer causes the computer to:

investigate if the field devices of the first group are able to communicate with the process control device via the first wireless communication network while meeting the communication restriction requirement, and in case the communication restriction requirement is not met, redirect communication between some of the field devices in the first group and the process control device to the second wireless communication network so that the communication restriction requirement is met for a first part of the field devices in the first group using the first wireless communication network and for a second part of the field devices of the first group using the second wireless communication network.

The invention has many advantages. It enables the meeting of a communication restriction requirement that is impossible to meet using a single wireless communication network. This makes it possible to use a slow wireless communication technology even though the restriction requirement is tight. This may also be done with limited additional costs, because a second wireless communication network may already be present for other purposes.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION OF THE INVENTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention is generally directed towards the use of wireless communication networks in relation to the control of industrial processes.

In relation to industrial processes such as pulp and paper production, oil production and refinement and manufacturing processes it is of interest to use wireless communication networks like a wireless sensor and actuator network in the control, for instance in closed-loop control, of the process. Examples on these types of wireless communication networks are Wireless Hart, ZigBee and ISA 100.11A. However, the control may put restrictions on the communication in the wireless communication network that are hard to meet.

Figure 1:
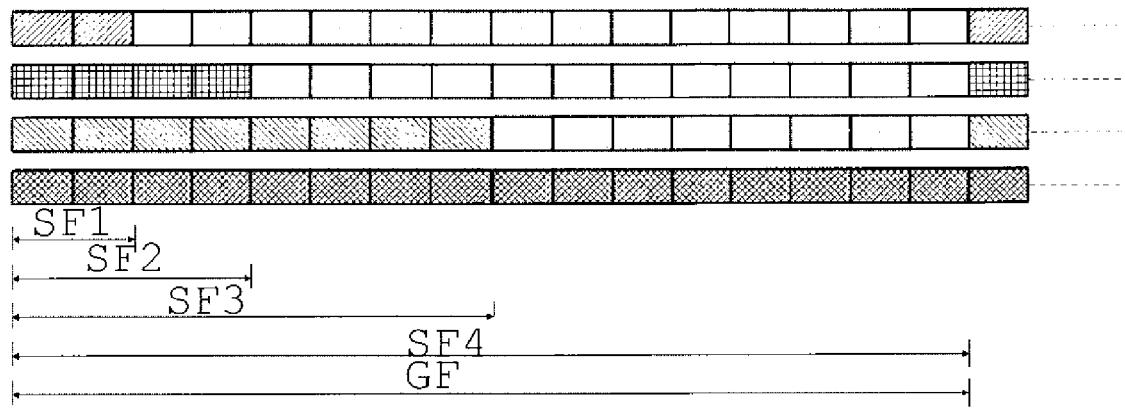
FIG. 1 schematically shows the communication structure used by a wireless communication network.
Figure 2:
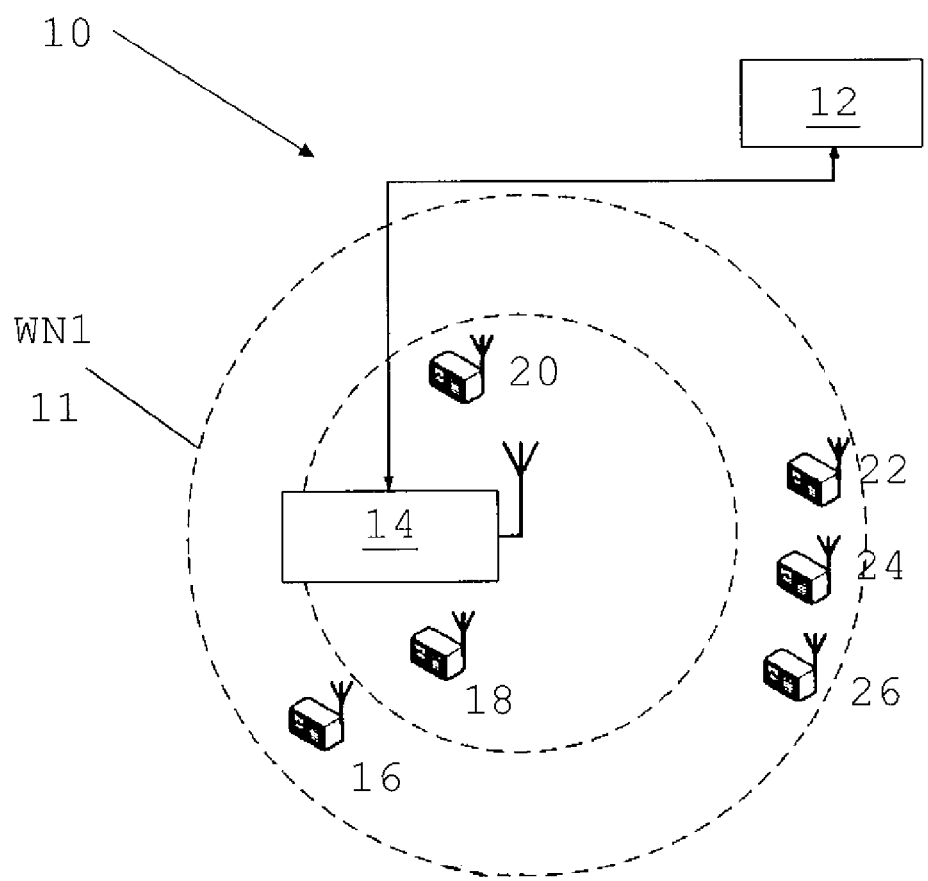
FIG. 2 schematically shows a first wireless communication network with a first group of field devices communicating with a process control device via a first communication scheduling device.
Figure 3:
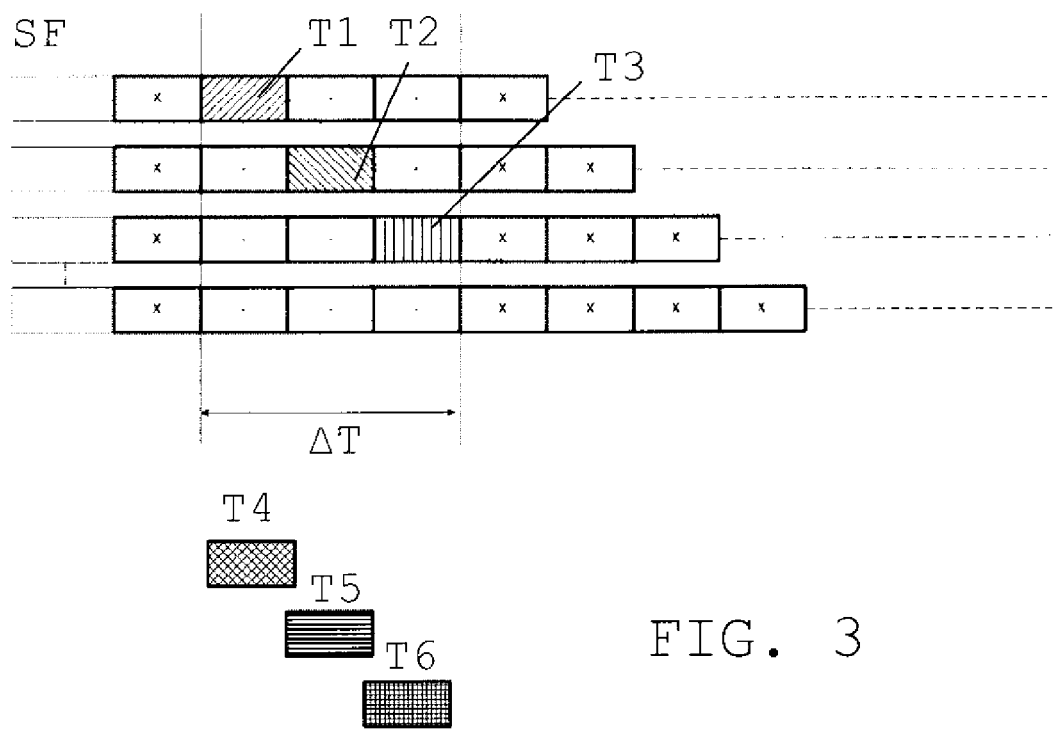
FIG. 3 schematically shows a communication limitation that is imposed on the communication structure of the first wireless communication network by the process control unit.

How such restrictions can influence a process control system will now be described in some more detail with reference being made to FIG. 1-3, where FIG. 1 schematically shows the communication structure used by a wireless communication network, FIG. 2 schematically shows a control system including a process control device 12 connected to a first wireless communication network 11, where there is a first group of field devices 16, 18, 20, 22, 24 and 26 in this first wireless communication network and FIG. 3 shows the scheduling of the communication of the first group of field devices when there is a communication restriction imposed on the communication structure.

A control device 12 is typically provided for controlling a process (not shown) such as a pulp and paper production process or a manufacturing process. The control device may for instance be a controller, like a PLC (programmable logic controller). For this reason a first application may be running in the process control device 12, which first application is a control application performing real-time control of the process or a part of the process. In order to perform this control the first application obtains a number of process measurements via a first, second, third, fourth, fifth and sixth field device 16, 18, 20, 22, 24 and 26. The field devices are thus interfaces to the industrial process. Measurements can here be any type of process characterising measurements, i.e. measurements providing characteristics of the process being controlled, such as temperature measurements, pressure measurements and voltage measurements. In order to provide a reliable control the measurements have to be made at the same point in time and reported to the process control device 12. The process control device 12 can then determine a control activity based on the measurements and then perform the activity through actuating an actuator (not shown) based on these measurements. However, it is normally not possible to determine the control activity before all measurements have been received from the field devices. The control of the process may furthermore have a time requirement, which means that the actuator has to be actuated within a time limit from the time of measurement in order for the control to function properly. It can therefore be seen that there is a time limitation put on the process control system.

The process control device 12 here uses the first wireless communication network 11 for communicating with the field devices 16, 18, 20, 22, 24 and 26. This means that the time in which their measurements reach the process control device 12 is dependent on the way that the first wireless communication network provides communication for the field devices. This time is dependent on the communication structure. In this example the first wireless communication network is employing the Wireless Hart communication standard and thus the structure of this standard.

The communication is scheduled by the first communication scheduling device 14. This device may be a combined gateway and network manager. The way this scheduling is generally performed is shown in FIG. 1. Wireless Hart uses a TDMA (Time Division Multiple Access) network protocol. This means that the first gateway 14 schedules communication into time slots. The time slots, which typically have a fixed size such as 10 ms, are furthermore grouped together in superframes that repeat over time. In FIG. 1 there a four superframes shown SF1, SF2, SF3 and SF4. The superframes co-exist and each comprises a different number of time slots. The sizes of the superframes can be defined by the required communication density, i.e. by the number of entities that are supposed to report together to an application, like the number of field devices that are to communicate with the first application of the process control device 12. As an example the first superframe SF1 has the size of two time slots, the second superframe SF2 has the size of four time slots, the third superframe SF3 has the size of eight time slots while the fourth superframe SF4 has the size of sixteen time slots. The superframes furthermore together form a gigaframe GF, which has a time period corresponding to the least common multiple of the superframes in the wireless communication network. The superframes may have the same repetition rate, which is set by the Gigaframe size. However, it is also possible that a superframe is repeated more than once in a Gigaframe. Therefore a new Gigaframe and all of its superframes start at the end of a previous Gigaframe.

In Wireless Hart multiple communications may be performed in the same time slot. One slot can thus be associated with multiple communication activities.

In this case the first communication scheduling device 14 can employ a CSMA (Carrier Sense Multiple Access) approach in order to allow only one entity to communicate in a time slot at a time, because collisions may hinder the transmission of data scheduled for the given common slot. At a possible extreme, two entities planning to use a certain time slot may be stopped from communication because of such a collision. Thus, the safest solution in this sense is that a single entity is allowed to transmit in one slot. It is thus possible that all field devices in the first wireless communication network are assigned time slots where they are the only senders of the information.

Here it can also be mentioned that it may be possible for two field devices to communicate in the same time slot but in different channels. However, this requires that the first communication scheduling device is equipped with multiple access points.

As is evident from what has been described above, the field devices 16, 18, 20, 22, 24 and 26 in FIG. 2 are scheduled by the communication scheduling device 14 for communicating with the process control device 12 in the same superframes with the data having the same time stamp and in separate time slots. These time slots are with advantage consecutive time slots. Data having a following time stamp will then be transmitted in the same time slots of a following superframe. However, suppose now that a communication restriction requirement is imposed on the communication structure, which communication restriction requirement may state that all measurements of the same time stamp intended for the first application of the process control device 12, i.e. all transmissions in the same superframe, are to be transmitted within a time interval $\Delta T$ defined by the process control device 12.

Now further assume that this time interval $\Delta T$ is so small that there is a limit on the number of time slots of the superframe that may be fitted in the interval. This situation can be seen in FIG. 3, where three transmissions T1, T2 and T3 with data from the first, second and third field device 16, 18 and 20 fit within the time interval $\Delta T$. However, the transmission T4, T5 and T6 of data from the field devices 22, 24 and 26 do not fit in the interval.

In this situation it is thus not possible to perform the control activity of the process control device 12 and fulfil the communication restriction requirement, which may jeopardize the control.

How this is addressed according to the principles of the present invention will now be described with reference being made to the previously mentioned FIG. 3 and to FIGS. 4, 5, 6 and 7.

Figure 4:
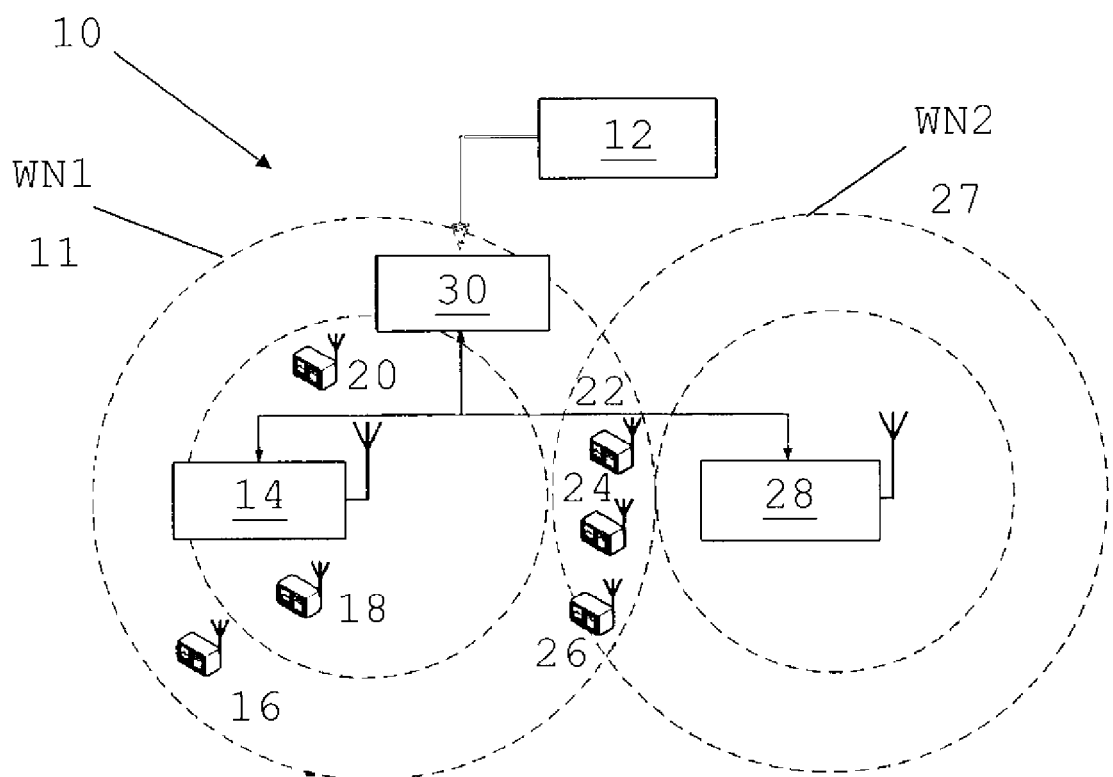
FIG. 4 schematically shows a process control system including the process control device and the first wireless communication network with the first group of field devices from FIG. 2 together with a network supervisor device and a second wireless communication network with a second communication scheduling device.

FIG. 4 here schematically shows the process control system 10 with the first wireless communication network 11, the first communication scheduling device 14, the first group of field devices 16, 18, 20, 22, 24 and 26 and the process control device 12 from FIG. 2. However in this figure there is furthermore a second wireless communication network WN2 27 of the same type as the first wireless communication network 11 and also provided with a second communication scheduling device 28 for scheduling communication in this second wireless communication network 27. There is furthermore a network supervisor device 30 on one hand connected to the first and second data scheduling devices 14 and 28 and on the other to the process control device 12. The first and second wireless communication networks 11 and 27 are furthermore completely or partly overlapping and in this example partly overlapping. Each has a core, shown as a dashed inner circle, and a periphery, shown as a dashed outer circle. The periphery of the first wireless communication network 11 here has an area shared with the periphery of the second wireless communication network 27. In this shared area the fourth, fifth and sixth field devices 22, 24 and 26 of the first group are located. This means that at least part of the geographical area covered by the first wireless communication network is also covered by the second wireless communication network. The first wireless communication network 11 here uses a first communication structure, while the second wireless communication network 27 uses a second communication structure, which structures are with advantage of the same type and in this example of the type provided by the Wireless Hart standard as shown in FIG. 1.

Figure 5:
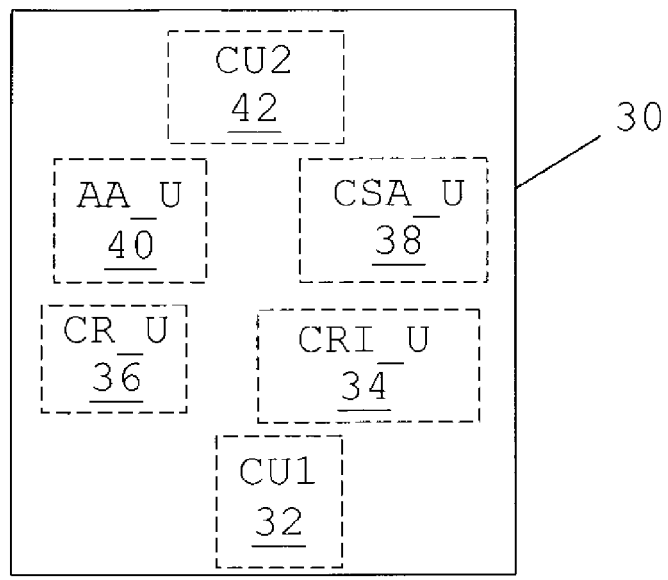
FIG. 5 shows a block schematic of one embodiment of the network supervisor device according to the invention.

FIG. 5 shows a block schematic of the network supervisor device 30. It includes a first communication unit CU1 for communicating with the two communication scheduling devices 14 and 28 as well as a second communication unit CU2 42 for communicating with the process control device 12. The first communication unit here provides communication according to the communication protocol used for reaching the communication scheduling devices outside of the wireless communication networks and the second communication unit provides communication according to a communication protocol used for reaching the process control device. The network supervising device 30 furthermore comprises a communication restriction investigating unit CRI_U 34, a communication relocating unit CR_U 36, a communication structure aligning unit CSA_U 38 and an application adding unit AA_U 40.

The functioning of the communication restriction investigating unit 34 and communication relocating unit 36 will shortly be described in relation to a first embodiment of the invention, while the functioning of the communication structure aligning unit 38 and the application adding unit 40 will be described later in relation to further embodiments of the invention.

Figure 6:
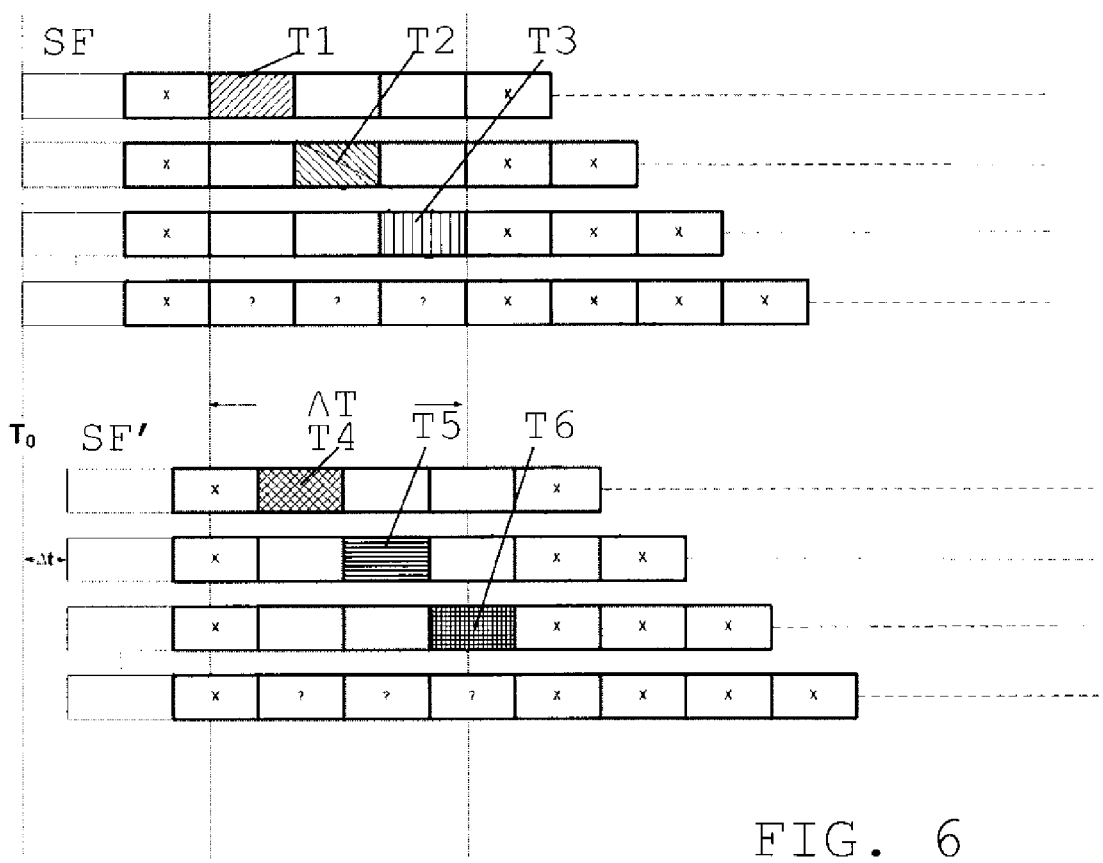
FIG. 6 schematically shows the scheduling of communication of the first group of field devices in the first and second wireless communication network in order to meet the communication restriction requirement.
Figure 7:
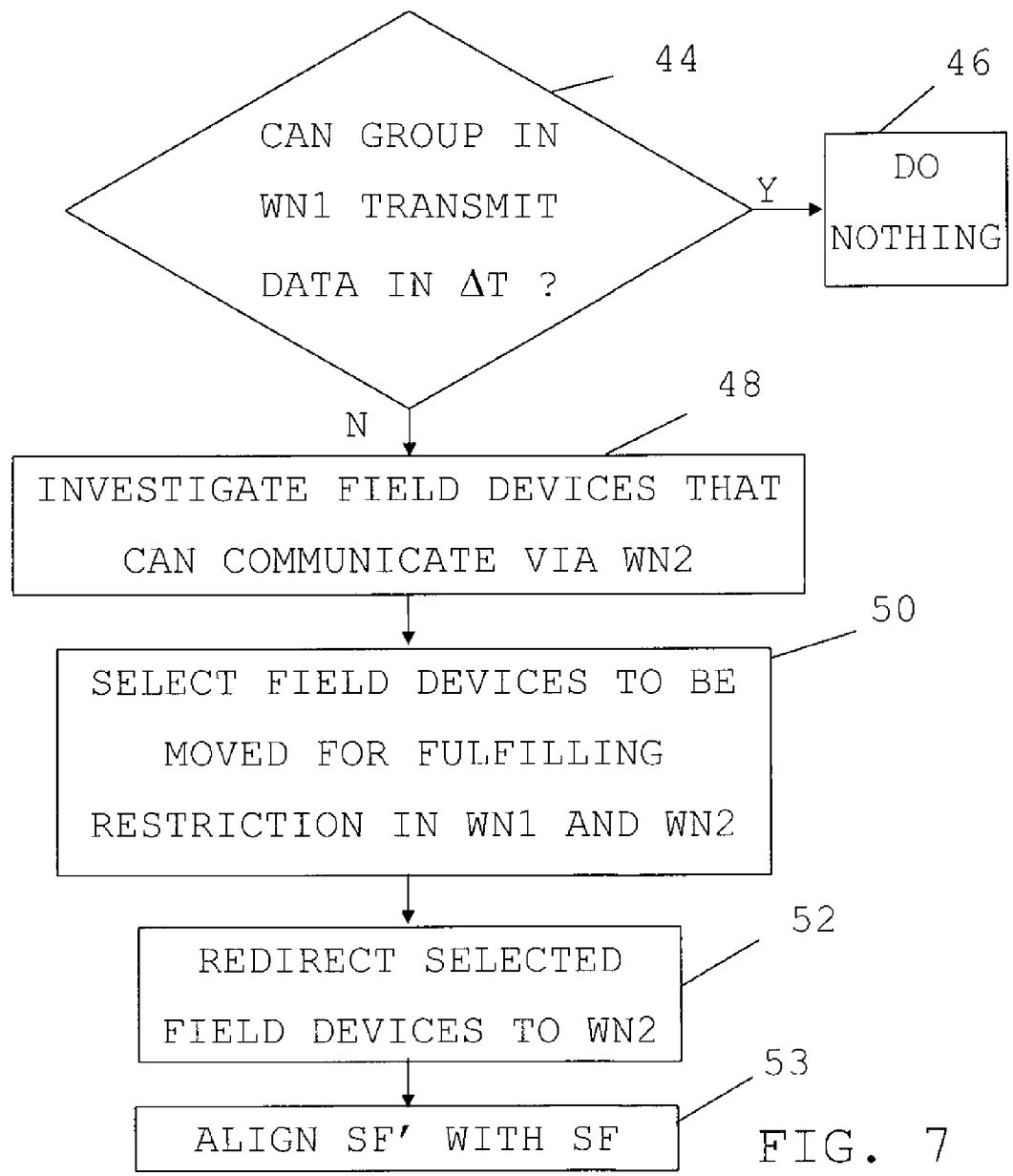
FIG. 7 shows a flow chart of a number of method steps according to one embodiment of the invention and being performed by the network supervisor device.

FIG. 6 schematically shows how the transmissions T1, T2, T3, T4, T5 and T6 of the field devices in the first group are scheduled in superframes SF and SF1' of the first and second communication structures in both the first and second wireless communication networks in order to meet the above mentioned communication restriction requirement $\Delta T$, while FIG. 7 shows a flow chart of a number of method steps performed by the network supervisor device for performing a method according to the first embodiment of the invention.

Now the first embodiment of the invention will be described with reference being made to FIG. 3-7.

As mentioned earlier, the first group of field devices, i.e. the first, second, third, fourth, fifth and sixth field devices 16, 18, 20, 22, 24 and 26 are all associated with the first application being run by the process control device 12, which first application in this example is a real-time process control application. This means that they communicate with the first application. In this example the devices are all sensors. That they are associated with the first application in this case involves them providing data to this first application, which data is then used by the application in the process control device for determining a control action. This control action is then performed by one or more actuators in the system (not shown), where one or more of these actuators may be other field devices in the first and/or second wireless communication network 11 and 27.

The field devices in the first group are furthermore here also assigned to or associated with the first wireless communication network 11. This means that they have been assigned to this wireless communication network for communicating with the control device 12. Here the first communication scheduling device 14 furthermore schedules the transmission of these field devices into time slots of the communication structure.

The communication restriction investigating unit 34 may communicate with the process control device 12 via the second communication unit 42 in order to find out which field devices are a part of the first group, i.e. which field devices that are associated with or reporting to the first application of the process control device 12 as well as to find out which communication restrictions this application applies, typically in the form of maximum allowable delay of measurements. As an alternative it is possible that this information is obtained other ways. It may for instance be provided beforehand in the communication restriction investigating unit 34. Based on this maximum allowable time delay, the communication restriction investigating unit 34 may then determine the communication restriction requirement, here the time interval ΔT within which the measurements have to be provided by the first wireless communication network 11. As an alternative the first application can inform the communication restriction investigating unit 34 about the communication restriction requirement. The communication restriction investigating unit 34 may also communicate with the first communication scheduling device 14 to find out the time slot size and perhaps also delay as well as which of the field devices of the first group this device is communicating with. Also this information may as an alternative be known beforehand. The communication restriction investigating unit 34 may here typically receive information from the first communication scheduling device 14 that it is communicating with all of the field devices of the first group. The communication restriction investigating unit 34 then investigates if the field devices in the first group are able to communicate with the process control device 12 via the first wireless communication network 11 while fulfilling the communication restriction requirement. In this embodiment this may be done through determining a time value through multiplying the number of time slots to be occupied by the field devices of the first group with the time slot size. This time value is then compared with the time interval ΔT. If the time value is within the interval, i.e. if the communication restriction requirement is met through the field devices of the first group being able to transmit data in the first wireless communication network within the time interval ΔT, step 44, then nothing is done, step 46. However, if the time value is outside, step 44, the communication restriction requirement is not met and this fact is signalled to the communication relocating unit 36.

As can be seen in FIG. 3, the communications of the first group cannot be contained within the time interval ΔT and therefore the requirement is not met.

The communication relocating unit 36 then investigates, via the first communication interface 32, which of the field devices in the first group are able to communicate via the second wireless communication network, step 48. This may be done through querying the second communication scheduling device 28 of it is able to pick up any signals from the field devices in the first group. This may optionally also involve querying the second communication scheduling device 28 about which of these field devices that it is able to communicate with that has the highest link quality, for instance which has the highest signal strength, lowest interference lowest, bit error rate etc.

The communication relocating unit 36 then selects field devices to be moved for fulfilling the communication restriction requirement in both the first and the second wireless communication network 11 and 27, step 50. The field devices being selected may need to be field devices found to be able to communicate with the second wireless communication network. This may involve selecting field devices until the time value associated with the remaining field devices of the first group in the first wireless communication network becomes equal or smaller than the time interval ΔT and before the time interval is exceeded by communication of the field devices of the first group that are moved to the second wireless communication network 27. This may also involve selecting field devices that fulfil at least one selection criterion, where one selection criterion may be field devices having the best link quality to the second communication scheduling device 28. In this selection it is possible to combine investigating link qualities in the second wireless communication network with an investigation about the link qualities in the first wireless communication network, which would be a second selection criterion. It is thus possible to also consider the link qualities of the field devices in the first group that are able to communicate with the second wireless communication network and then the link qualities to both the first and the second wireless communication networks.

The communication relocation unit 36 then redirects the selected field devices to the second wireless communication network 27, step 52. This may furthermore be done through redirecting the communication of the moved field devices to the corresponding time slots of the superframe SF' of the second wireless communication network, i.e. to time slots in the second wireless communication network that are overlapping the time slots in the first wireless communication network assigned to the communication of the field devices that remain in the first wireless communication network. The relocated field devices may be redirected to a part of the communication structure of the second wireless communication network that together with a part of the communication structure of the first wireless communication network used for the field devices that remain in the first wireless communication network fulfils the communication restriction requirement. This may be done through obtaining information from the first communication scheduling device 14 of which time slots are to be assigned to the field devices that remain in the first wireless communication network and request the second communication scheduling device 28 to schedule communication from the moved field devices in consecutive time slots provided close to these in time so that the communication restriction requirement is fulfilled. All these time slots of both communication structures should be transmitted within the time interval.

The situation after this has been done is shown in 6. Here the first group of field devices has been divided into two parts, a first part that uses the first wireless communication network and a second part that uses the second wireless communication network. As can be seen the transmissions T4, T5 and T6 of the fourth fifth and sixth field devices have here been moved to the second wireless communication network so that the transmissions T4, T5 and T6 of the these field devices are performed in a number of time slots the sum of which is shorter than the time interval $\Delta T$, while the transmissions T1, T2 and T3 in the first wireless communication network are performed in a number of time slots the sum of which is also shorter than the time interval $\Delta T$.

It can also be seen that it is possible that the communication structures of the two wireless communication networks may not be aligned with each other, but one may be delayed in relation to the other. In the example of FIG. 6 it can be seen that the start of transmission of a superframe SF' in the second communication structure is delayed a time $\Delta t$ compared with the start of transmission $T_0$ of the superframe SF of the first wireless communication network. It can thus be seen that the communication structure of one of the wireless communication networks may need to be aligned with the communication structure of the other wireless communication network. It is therefore possible that one of the wireless communication networks is requested to align its communication structure to the communication structure of the other. This ordering may be performed by the communication structure aligning unit 38. This unit may communicate with the communication scheduling devices of the two wireless communication networks via the first communication unit 32 for obtaining the start of superframe transmission, determine a delay $\Delta t$ between them based on this information, determine if the field devices in the second (or first) wireless communication network still meet the requirement despite the delay and instruct the communication scheduling devices to align their communication structures, here the superframes SF and SF', in case the requirement is not fulfilled, step 53. It should here be realized that they may be requested to align their communication structures even if the communication restriction requirement is met. Communication structure aligning can thus be performed without investigating a delay between the two structures.

It can thus be seen that it is now possible to meet the communication restriction requirements that a single wireless communication network is unable to meet. This makes it possible to use a slow wireless communication technology even though the restriction requirements are tight. This may also be done with limited additional costs, because a second wireless communication network may already be present for other purposes, such as for another application like an application used for monitoring the process and generating alarms.

There are here several variations that are possible to make of the present invention. As mentioned above one or more control actions for one or more actuators may be determined based on measurements. If more than one such actuator is provided in a wireless communication network, such as the first wireless communication network, it is possible that there exists a communication restriction requirement on the communication of control action instructions to the field devices acting as actuators. The same principle that was described above in relation to field devices acting as sensors can be applied on field devices acting as actuators. In case such actuators are provided in the same wireless communication network as a sensor it is possible that control action instructions are transmitted in the same or corresponding superframe as sensor readings. Then it may be important that there is sufficient separation between the time slots carrying sensor readings or measurements and the time slots carrying control action instructions such that they do not interfere with each other. It is also possible that there is no need to address a communication restriction requirement for field devices acting as sensors, but only for field devices acting as actuators.

It is also possible to add field devices in a wireless communication network that are to be associated with an application, for instance that field devices are added to the first group in the first wireless communication network that are to be associated with the first application handled by the process control device. It is thus possible that the number of field devices in the second part of the first group of filed devices is increased because of this adding. In this case the communication restriction investigating unit of the network supervisor device may perform a new investigation concerning which field devices the second wireless communication network can pick up signals from and based on that assign or move field devices to the second wireless communication network for fulfilling the communication restriction requirement in both wireless communication networks.

It is furthermore possible to add a further application to the process control system. This further application can be a control application, but it can also be a monitoring application. The application can be added to the existing process control device. However, it may also be provided in another device in the process control system, for instance a separate protection device like a protection computer or another process control device. It is here possible that a further group of field devices that are to communicate with the further application are placed in the first and/or the second wireless communication network and scheduled for communication with the second application using one or both of these. The field devices of the further group are thus assigned to communicate with the further application using at least one of the first and the second wireless communication network. If this communication is made in a wireless communication network that is shared with a part of the first group of field devices it is here possible to use the same or another superframe as compared with the superframe used for the first application. It is also possible to apply the same principle for handling communication restriction requirements. However it is in such shared wireless communication networks important that there is a sufficient separation, for instance in time, between the part of the communication structure used for this further application and with the part used for the first application. The handling of these aspects in the network supervisor device is performed by the application adding unit. The application adding unit is thus configured to assign the field devices of the further group to communicate with the further application using at least one of the first and second wireless communication networks.

Figure 8:
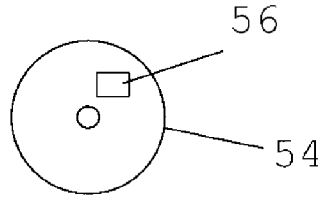
FIG. 8 schematically shows a computer program product according to an embodiment of the invention in the form of a CD ROM disc on which a computer program is provided.

The network supervisor device may with advantage be provided in the form of a processor with associated program memory including computer program code for performing the functionality of the various units that it includes. It should be realized that the device may also be provided in the form of hardware, like for instance in the form of an ASIC circuit. The computer program code may also be provided on a computer readable means, for instance in the form of a data carrier, like a CD ROM disc, a memory stick or a DVD disc, which will implement the function of the above-described units of the network supervisor device when being loaded into a computer. One such computer program product in the form of a CD ROM disc 54 with computer program code 56, for instance in the form of a computer program, is schematically shown in FIG. 8.

The program code can thus also be provided as a pure computer program. This computer program would then include computer program modules, which include computer program instructions that implement the functionality of the units in the network supervisor device. This program may be downloaded from a server, for instance via the Internet or via a point-to-point connection.

While the invention has been described in connection with what is presently considered to be most practical and preferred embodiments, it is to be understood that the invention is not to be limited to the disclosed embodiments, but on the contrary, is intended to cover various modifications and equivalent arrangements.

There are thus a number of further variations that are possible to make of the present invention.

It should for instance be realized that the two systems may not need synchronization or that they are already synchronised, in which case there is no need for communication structure aligning or communication structure aligning unit in the network supervisor device. It is also possible to omit the application adding functionality and application adding unit. The use of two communication units in the network supervisor device may be needed in case the process control device and communication scheduling devices use different communication protocols. They may however use the same type of communication protocol in which it may be sufficient with one communication unit. The network supervisor device may furthermore be a part of a communication scheduling device of a wireless communication network as well as a part of a process control device.

The field devices were above described in relation to a single hop environment. It is possible to employ the present invention also in a multi-hop environment, i.e. with one or more of the field devices acting as a relay device for other field devices. However, then it is important that also the time of the hopping is considered for meeting the communication restriction requirement. Furthermore, the network supervisor device was described as investigating which of the field devices of a group associated with one wireless communication network that were in contact with the other wireless communication network. This can also be omitted. It is instead possible to apply a trial and error scheme in that the network supervisor device selects one field device for being moved and refrains from moving it and instead selects another one if the communication scheduling device of the other wireless communication network informs the network supervisor device that it cannot find the initially selected field device. The invention was furthermore described in relation to two wireless communication networks. It should here be realized that the teachings of the invention can easily be applied using more wireless communication networks. Therefore the invention is only to be limited by the following claims.

What is claimed is:

1. A method of allowing a group of field devices in a process control system for an industrial process to communicate with a process control device while meeting a communication restriction requirement, the method being performed in a network supervisor device of the process control system, said process control system further comprising a first wireless communication network having a first communication structure with a superframe comprising time slots, a second wireless communication network having a second communication structure with a superframe comprising time slots, and a first group of wireless field devices interfacing the industrial process, being associated with the first wireless communication network and communicating with a first control application being carried out by the process control device, the method comprising the steps of:

investigating if the field devices of the first group are able to communicate with the process control device via the first wireless communication network in the same superframe in separate consecutive time slots with data having the same time stamp while meeting the communication restriction requirement, where the communication restriction requirement is that all transmissions for the first control application of the same superframe fit in a time interval defined by the process control device, and in case the communication restriction requirement is not met, redirecting communication between some of the field devices in the first group and the process control device to the second wireless communication network so that the communication restriction requirement is met for a first part of the first group of field devices using the first wireless communication network and for a second part of the first group of field devices using the second wireless communication network, through requesting scheduling of communication of the field devices in the second part of the first group in consecutive time slots of the second communication structure that are close to the time slots assigned to field devices in the first part of the first group remaining in the first wireless communication network so that all time slots in the first communication structure and the second communication structure used by the first part of the first group of field devices and the second part of the first group of field devices are transmitted within the time interval.

2. The method according to claim 1, further comprising the step of aligning the communication structure of one of the wireless communication networks to the communication structure of the other wireless communication network.

3. The method according to claim 1, further comprising the step of increasing the number of field devices of the second part of the first group when new field devices are added to the first group.

4. The method according to claim 1, wherein a further control application is added to the system with which a further group of field devices are to communicate, the method comprising the further steps of assigning the field devices of the further group to communicate with the further control application using at least one of the first and second wireless communication networks.

5. The method according to claim 1, further comprising the step of investigating which field devices in the first group are able to communicate with the second wireless communication network and performing the step of redirecting for field devices that are able to communicate with the second wireless communication network.

6. The method according to claim 5, further comprising the step of selecting the field devices in the second part of the first group based on at least one selection criterion and performing the step of redirecting for the selected field devices.

7. A network supervisor device for an industrial process control system, said industrial process control system comprising at least one process control device, a first wireless communication network having a first communication structure with a superframe comprising time slots, a second wireless communication network having a second communication structure with a superframe comprising time slots, and a first group of wireless field devices interfacing the industrial process, being associated with the first wireless communication network and communicating with a first control application being carried out by the process control device, the network supervisor device comprising a communication restriction investigating unit configured to investigate if the field devices of the first group are able to communicate with the process control device via the first wireless communication network in the same superframe in separate consecutive time slots with data having the same time stamp while meeting a communication restriction requirement, where the communication restriction requirement is that all transmissions for the first control application of the same superframe fit in a time interval defined by the process control device, and a communication relocating unit configured to, in case the communication restriction requirement is not met, redirect communication between some of the field devices in the first group and the process control device to the second wireless communication network so that the communication restriction requirement is fulfilled for a first part of the first group of field devices using the first wireless communication network and for a second part of the first group of field devices using the second wireless communication network through requesting scheduling of communication of the field devices in the second part of the first group in consecutive time slots of the second communication structure that are close to the time slots assigned to field devices in the first part of the first group remaining in the first wireless communication network so that all time slots in the first communication structure and the second communication structure used by the first part of the first group of field devices and the second part of the first group of field devices are transmitted within the time interval.

8. The network supervisor device according to claim 7, further comprising a communication structure aligning unit configured to order one of the wireless communication networks to align its communication structure to the communication structure of the other wireless communication network.

9. The network supervisor device according to claim 7, wherein the communication relocating unit is further configured to increase the number of field devices in the second part of the first group as new field devices are added to the first group.

10. The network supervisor device according to claim 7, wherein a further control application is added to the system and with which a further group of field devices are to communicate, the network supervisor device further comprising an application adding unit configured to assign the field devices of the further group to communicate with the further control application using at least one of the first and second wireless communication networks.

11. The network supervisor device according to claim 7, wherein the communication relocating unit is further configured to investigate which field devices in the first group are able to communicate with the second wireless communication network and to perform redirecting for field devices that are able to communicate with the second wireless communication network.

12. The network supervisor device according to claim 11, wherein the communication relocating unit is further configured to select the field devices in the second part of the first group based on at least one selection criterion and performing the redirecting for the selected field devices.

13. A computer program product for allowing a group of field devices in a process control system for an industrial process to communicate with a process control device while meeting a communication restriction requirement, said process control system further comprising a first wireless communication network having a first communication structure with a superframe comprising time slots, a second wireless communication network having a second communication structure with a superframe comprising time slots and a first group of wireless field devices interfacing the process, being associated with the first wireless communication network and communicating with a first control application being carried out by the process control device, the computer program product comprising computer program code stored in non-transitory computer readable media and executing on a computer and causing the computer to:

investigate if the field devices of the first group are able to communicate with the process control device via the first wireless communication network in the same superframe in separate consecutive time slots with data having the same time stamp while meeting the communication restriction requirement, where the communication restriction requirement is that all transmissions for the first control application of the same superframe fit in a time interval defined by the process control device, and in case the communication restriction requirement is not met, redirect communication between some of the field devices in the first group and the process control device to the second wireless communication network so that the communication restriction requirement is met for a first part of the first group of field devices using the first wireless communication network and for a second part of the first group of field devices using the second wireless communication network through requesting scheduling of communication of the field devices in the second part of the first group in consecutive time slots of the second communication structure that are close to the time slots assigned to field devices in the first part of the first group remaining in the first wireless communication network so that all time slots in the first communication structure and the second communication structure used by the first part of the first group of field devices and the second part of the first group of field devices are transmitted within the time interval.

14. The method according to claim 1, wherein the industrial control process is a pulp and paper process.

15. The method according to claim 1, wherein the industrial control process is an oil or gas production process.

16. The method according to claim 1, further comprising a third wireless communication network having a third communication structure with a superframe comprising time slots, wherein the step of redirecting includes redirecting communication between some of the field devices in the first group and the process control device to the third wireless communication network so that the communication restriction requirement is met for a first part of the first group of field devices using the first wireless communication network, for a second part of the first group of field devices using the second wireless communication network, and for a third part of the field devices of the first group using the third wireless communication network.

* * * * *